No. 722,788. PATENTED MAR. 17, 1903.
J. F. WHITE.
GRAIN ELEVATOR.
APPLICATION FILED JULY 26, 1902.
NO MODEL. 2 SHEETS—SHEET 1.
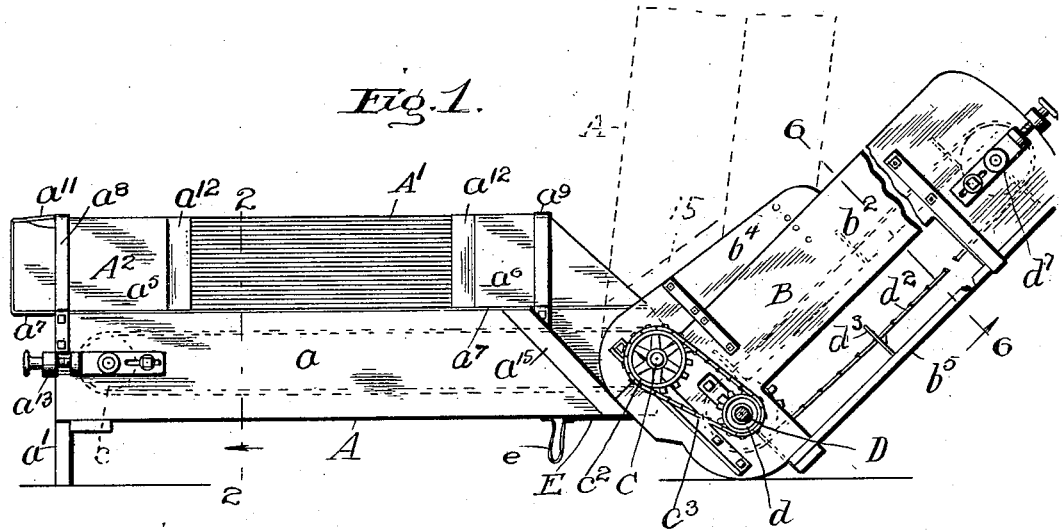
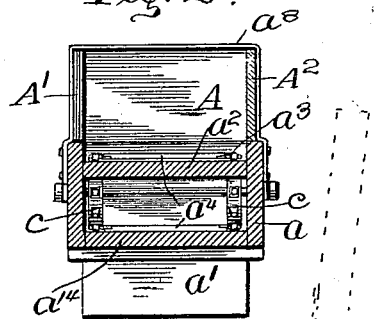
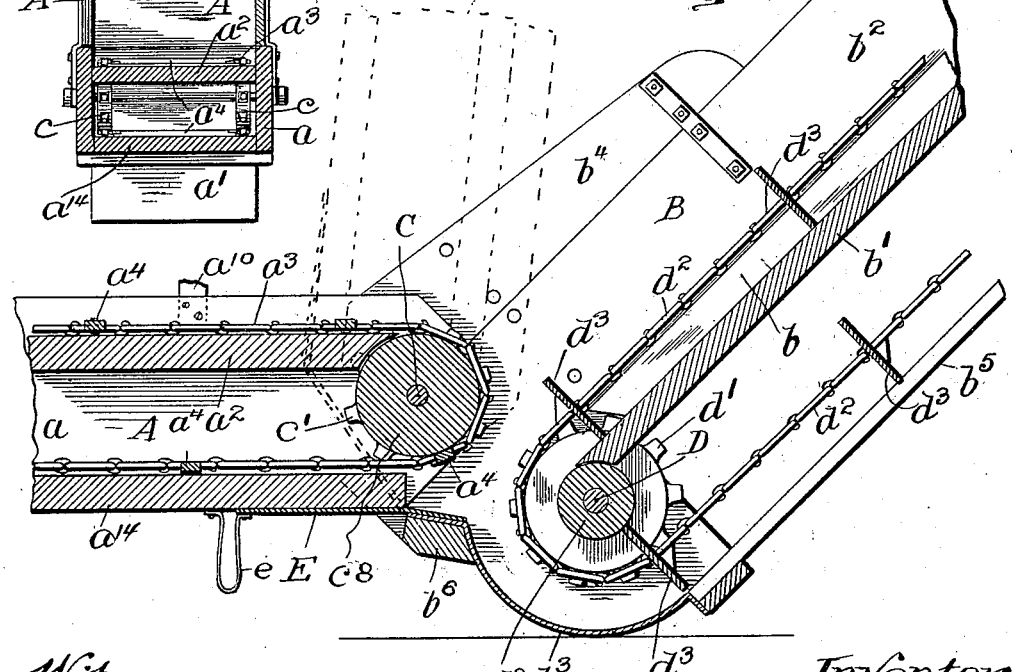

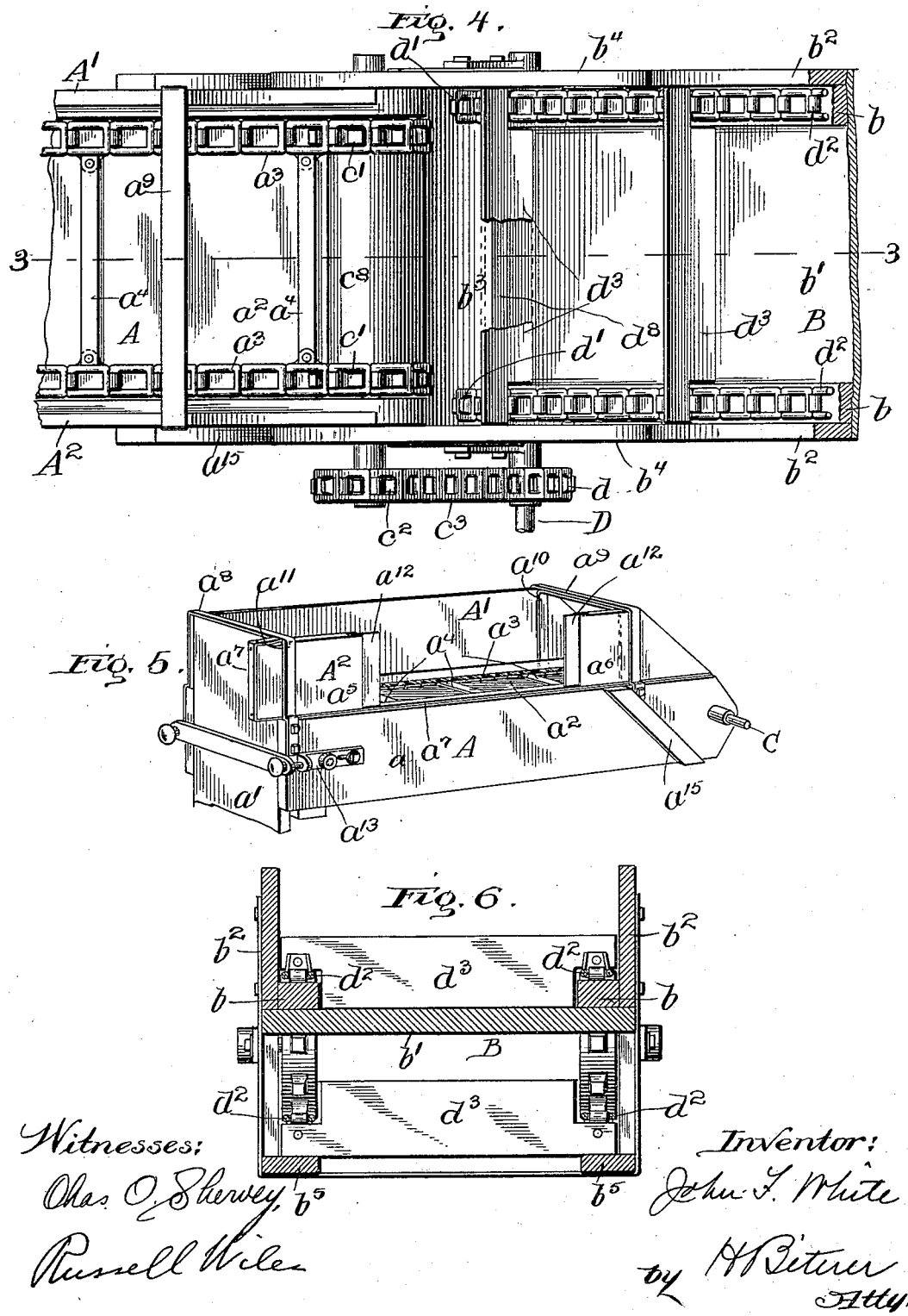

UNITED STATES PATENT OFFICE.

JOHN F. WHITE, OF RACINE, WISCONSIN.

GRAIN-ELEVATOR.

SPECIFICATION forming part of Letters Patent No. 722,788, dated March 17, 1903.

Application filed July 26, 1902. Serial No. 117,072. (No model.)

*To all whom it may concern:*

Be it known that I, JOHN F. WHITE, a citizen of the United States of America, residing at Racine, in the county of Racine and State of Wisconsin, have invented certain new and useful Improvements in Grain-Elevators, of which the following is a specification.

My invention relates to certain new and useful improvements in grain-elevators, the object of which is to produce a device for unloading grains, both small and large, also vegetables and other like commodities from wagons and other receptacles and elevating or carrying them to suitable storage-receptacles.

To such end my invention relates to certain novel features of construction and arrangement, a description of which will be found in the following specification and the essential features more definitely pointed out in the claims.

In the drawings furnished herewith, Figure 1 is a side elevation of the elevator, the central portion of the conveyer being broken away to permit the view to be as large as possible upon the sheet. Fig. 2 is a transverse vertical section through the drag, the line of section being indicated by 2 2 of Fig. 1. Fig. 3 is a detail vertical longitudinal section through the drag and conveyer, the end portions being broken away and the line of section being indicated at 3 3 in Fig. 4. Fig. 4 is a plan view of the parts as seen in Fig. 3. Fig. 5 is a perspective view of the drag, and Fig. 6 is a detail cross-section in the line 6 6 of Fig. 1.

In the views, A represents the drag, and B the conveyer proper. The drag is hinged to the conveyer by means of a shaft C to permit the drag to be swung upward into the position indicated by the dotted lines in Figs. 1 and 3, so that a wagon may be driven past the same instead of having to back the wagon up to it. Although this elevator can be used in connection with an ordinary wagon adapted to dump its contents into the box, yet the device has been designed to operate in conjunction with a wagon having my improved end-gate (shown and described in an application for Letters Patent filed by me on the 1st day of July, 1902, and allotted Serial No. 113,909) and in connection with a wagon-jack or other device adapted to raise up the front end of the wagon, so that the contents may run out freely, the end-gate forming a chute or guide for the flow of grain.

The drag is in the form of a rectangular box $a$, one end of which, $a'$, extends down below the bottom of the box to form a leg for supporting the free end of the drag. Within this rectangular box or frame is a false bottom or platform $a^2$, around which runs a conveyer-chain $a^3$, having the usual flights or conveyer-wings $a^4$ for carrying the material dumped upon the platform toward the conveyer proper. This chain passes around pulleys $c\ c'$, the pulley $c'$ being upon the shaft C and driven by the sprocket $c^2$, which is connected to a sprocket $d$ by a sprocket-chain $c^3$. (See Fig. 1.) Upon the rectangular frame are supported two guide-boards $A'\ A^2$, the guide-board $A'$ extending the whole length of the drag and the guide-board $A^2$ being made in two pieces $a^5\ a^6$, connected together by a piece of strap-iron $a^7$. (See Fig. 5.) The guide-board $A'$ is held in place by means of the leg $a'$ and three yoke-shaped supports $a^8\ a^9\ a^{10}$, secured upon the sides of the drag, and the guide-board $A^2$ is similarly supported, but is capable of slight longitudinal movement with respect to the body of the drag, so that when a wagon has been driven in position in front of the drag the side board $A^2$ may be adjusted to receive the end of the wagon. The inner edges of the two pieces $a^5\ a^6$ of the side board $A^2$ are provided with rubber strips $a^{12}$, so as to make a tight fit between the end-gate and the drag to prevent the spilling of any grain in flowing from the wagon to the same. The connecting-strip $a^7$ is turned up at the end to form a finger $a^{11}$, which is adapted to strike the support $a^8$ when the drag is upended, so as to prevent the side board $A^2$ from dropping into the conveyer proper. The connecting-strip is best seen in Fig. 5, which shows it passing down the outer edge of the board $a^5$, along the under side of the same, extending across the top of the side board $a$ of the drag, and under the board $a^6$ of the sliding side board $A^2$. It is secured to both boards by screwing it thereto or in any other suitable manner. It will be readily understood that these side boards may be interchanged when it is desired to dump the wagon upon the other side of the drag. The conveyer-chain $a^3$ is provided with a suitable tightening device $a^{13}$ for taking up the slack in the same, as is clearly indicated in Fig. 1. The drag is also provided with a bottom $a^{14}$, adapted to receive any grain the conveyer-chain $a^3$ may carry back into the drag. This will of course accumulate on the bottom until some time when the drag is upended, when it will fall into a portion of the conveyer proper and be raised or delivered with the other material.

The conveyer proper, B, consists of a platform $b'$ and side boards $b^2$, forming the trough through which the grain is carried. At the bottom of the conveyer proper is a receiving-hopper formed by the side boards and by a curved bottom $b^3$, into which the grain flows from the conveyer-chain $a^3$ of the drag. As shown in Figs. 1 and 2, the side boards are provided with extensions $b^4$ to prevent any spilling of the grain at this point. Below the side boards $b^2$ are supported two guide-boards $b^5\ b^5$, adapted to carry the flights from the conveyer-chain of the conveyer proper to prevent the sagging of the chain and consequent friction.

The shaft D may be driven by any suitable power, either horse or mechanical, and said shaft extends through the conveyer and carries within the same a pair of sprocket-wheels $d'$, around which pass two conveyer-chains $d^2$, which are connected by transversely-extending flights $d^3$. The chains $d^2$ run upon guide-strips $b$, and the flights are secured to said conveyer-chains about midway between their side edges, so that the pull upon said flights will be even and there will be no tendency to tilt in carrying the grain up the conveyer. The ends of these flights are consequently notched out, as seen in Fig. 6, to permit the lower edges of them to project to the platform $b'$ of the conveyer. The conveyer-chain $d^2$ passes around sprocket-wheels at the upper end of the conveyer, and suitable tightening mechanisms $d^7$ are provided to take up the excess slack of the chains. The shafts C D are surrounded by large hubs or collars $c^3\ d^8$, forming continuations of the platforms $a^2\ b'$, around which the flights $a^4\ d^3$ pass. The distance between the bottom $b^3$ and the hub $d^8$ is such as to permit the flights $d^3$ to freely pass through it and catch the grain which falls from the drag and carry it up to the platform $b'$. I have provided a rubber flap E, which is secured to a cross-bar $b^6$ of the conveyer, this flap being connected to the bottom of the drag by a strap $e$ and adapted to close the opening between the bottom of the drag and the hopper of the conveyer when the drag is swung up, as seen in Figs. 1 and 2. This prevents the spilling of any grain which may have been drawn in upon the bottom of the drag by the lower portion of the chain $a^3$.

The peculiar arrangement of the hopper $b^3$ prevents any choking up at this point, and by pivoting the drag between the side boards there is no danger of spilling any of the grain at this point.

As shown in Figs. 1 and 5, cleats $a^{15}$ are provided upon the sides of the drag, which form stops to position the drag when it is upended. These stops engage the extensions $b^4$ of the elevator proper when the drag is upended.

I claim as new and desire to secure by Letters Patent—

1. In a device of the class described, the combination with a conveyer-trough having a platform and raised guide-rails, of a conveyer-chain comprising chains running upon the guide-rails and transverse flights secured to said chains approximately midway between their edges, a shaft and sprocket-wheels for moving the chains and a hub or roller encircling the shaft and adapted to form a continuation of the platform upon which the adjacent edges of the flights may rest, substantially as described.

2. In a device of the class described, the combination with an elevator having suitable side portions extending from the bottom of the conveyer, of a drag pivoted within and between the side portions of the conveyer and a flexible strap extending between the adjacent bottom ends of the drag and conveyer and adapted to make a tight joint between the same, substantially as described.

3. In a device of the class described, the combination with a conveyer and a suitable receiving-trough at one end, of a drag pivoted to said conveyer within said trough, a suitable conveyer-chain running in said drag, a false bottom upon which the grain is dumped and carried to the conveyer, a real bottom below the lower bight of the conveyer, and a flexible connecting member between the trough and the real bottom of the drag, adapted to make a tight joint between the trough and drag, substantially as described.

4. In a drag for elevators, the combination with a rectangular frame, platform and conveyer-chain, of side boards removably secured thereto, one of which has a suitable opening between its ends to accommodate the end-gate of a wagon, substantially as described.

5. In a drag for elevators and the like, the combination with a suitable rectangular frame, platform, and suitably-driven conveyer-chain, of a suitably-supported side board composed of two portions $a^5$, $a^6$, a connecting member, $a^7$, and rubber facings, $a^{12}$, upon the inner edges of the portions, $a^5$, $a^6$, substantially as described.

6. In a drag for elevators and the like, the combination with a frame and conveyer-chain, of the supports, $a^8$, $a^9$, $a^{10}$, a side board, A', the two-part side board, A$^2$, and suitable means for limiting the movement of the two-part side board in one direction whereby when the drag is upended, the two-part side board will be held in proper position with respect to the drag, substantially as described.

7. In a device of the class described, the combination with a suitable elevator, of a drag pivoted thereto, supports, $a^8$, $a^9$, $a^{10}$, and the slidable side boards, $A'$, $A^2$, slidably secured on the drag by said supports, substantially as described.

8. In a device of the class described, the combination with an elevator having suitable side boards, of a drag pivoted to said side boards and having cleats, $a^{15}$, adapted when said drag is upended to form stops for supporting the drag in its upended position, substantially as described.

In witness whereof I have hereunto set my hand, at Chicago, in the county of Cook and State of Illinois, this 12th day of July, A. D. 1902.

JOHN F. WHITE.

Witnesses:
CHAS. O. SHERVEY,
RUSSELL WILES.